UNITED STATES PATENT OFFICE.

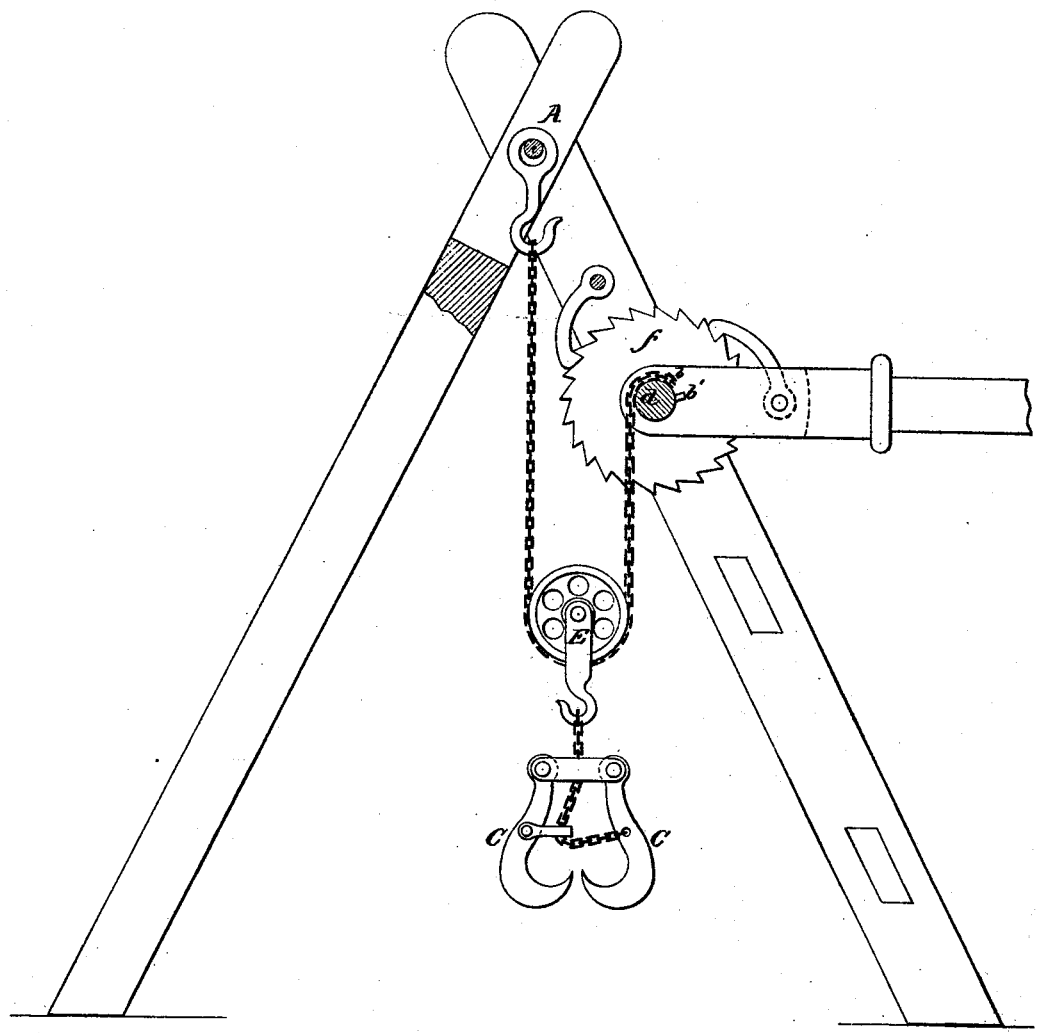

ELISHA W. CADY, OF TOMAH, WISCONSIN.

IMPROVEMENT IN STUMP-EXTRACTORS.

Specification forming part of Letters Patent No. 111,725, dated February 14, 1871.

*To all whom it may concern:*

Be it known that I, ELISHA W. CADY, of the town of Tomah, in the county of Monroe and State of Wisconsin, have invented a new and improved machine for pulling small trees and grubs and lifting stone and timber; and I do hereby declare that the following is a full and exact description of the construction and operation of the same, reference being had to the annexed drawing, making a part of this specification.

To the hook A is fixed a chain, which passes around a pulley, E, and thence to the pin $b$ on shaft $d$, the shaft $d$ being worked by means of a lever and ratchet-wheel, $f$. From the hook at the bottom of the pulley E is suspended a chain, to which the grappling-hooks C C are so attached that the greater the force exerted to raise the body to which they are fastened the firmer will be their hold on the object grasped.

The motion can be changed from slow to fast by unhooking the chain from A, and hooking it over the pin $b$ on shaft $d$, and operating the machine, as before, the parts above described being supported by wooden framework attached to an axle and wheels, so that it can be readily moved from place to place.

What I claim as my invention is—

The grappling-hooks C C, in combination with the pulley E, and the shaft $d$, and the ratchet-wheel and lever $f$, and the hook A, the parts being connected with chains, substantially as above set forth, for the uses and purposes above specified.

ELISHA W. CADY.

Witnesses:
JOHN S. PALMER,
T. G. ROYSTON.